United States Patent [19]
Den Broeder et al.

[11] Patent Number: 6,101,298
[45] Date of Patent: Aug. 8, 2000

[54] OPTICAL SWITCHING DEVICE

[75] Inventors: Friedrich J. A. Den Broeder; Ralph M. N. Hanzen; Peter A. Duine; Reiner M. Jungblut; Cornelis Draijer; Freddy Roozeboom; Paul Van Der Sluis, all of Eindhoven, Netherlands

[73] Assignee: U.S. Philips Corporation, New York, N.Y.

[21] Appl. No.: 09/037,892

[22] Filed: Mar. 10, 1998

[30] Foreign Application Priority Data

Mar. 17, 1997 [EP] European Pat. Off. ............. 97200789

[51] Int. Cl.$^7$ .................................................... G02B 6/32
[52] U.S. Cl. .............................................................. 385/16
[58] Field of Search ............................... 385/16, 21, 24, 385/147; 257/2

[56] References Cited

U.S. PATENT DOCUMENTS

| | | | |
|---|---|---|---|
| 5,635,729 | 6/1997 | Griessen et al. | 257/2 |
| 5,963,840 | 11/1999 | Xia et al. | 438/783 |
| 5,968,587 | 11/1999 | Frankel et al. | 427/8 |
| 5,994,209 | 11/1999 | Yieh et al. | 438/541 |

*Primary Examiner*—Akm E. Ullah
*Attorney, Agent, or Firm*—Steven R. Biren

[57] ABSTRACT

A description is given of an optical switching device (1) comprising a transparent substrate (3), a switching film (5) of a hydride compound of a trivalent transition or rare earth metal having a thickness of 300 nm, and a palladium capping layer (7) having a thickness of 30 nm. The capping layer is in contact with hydrogen. An electric current through the switching film (5) can be switched on and off between the terminals (9, 11). Joule heating of the switching film (5) causes a rapid transition from the transparent trihydride state to the absorbing dihydride state. By switching off the current, the switching film (5) cools down, which results in the formation of the absorbing dihydride state. The conversion between both states is reversible and can be repeated many times. The device can be used for controlling light beams, or it can be used in or for a display. Optionally, cooling of the switching film (5) is obtained with a Peltier element in thermal contact with the switching film (5).

9 Claims, 1 Drawing Sheet

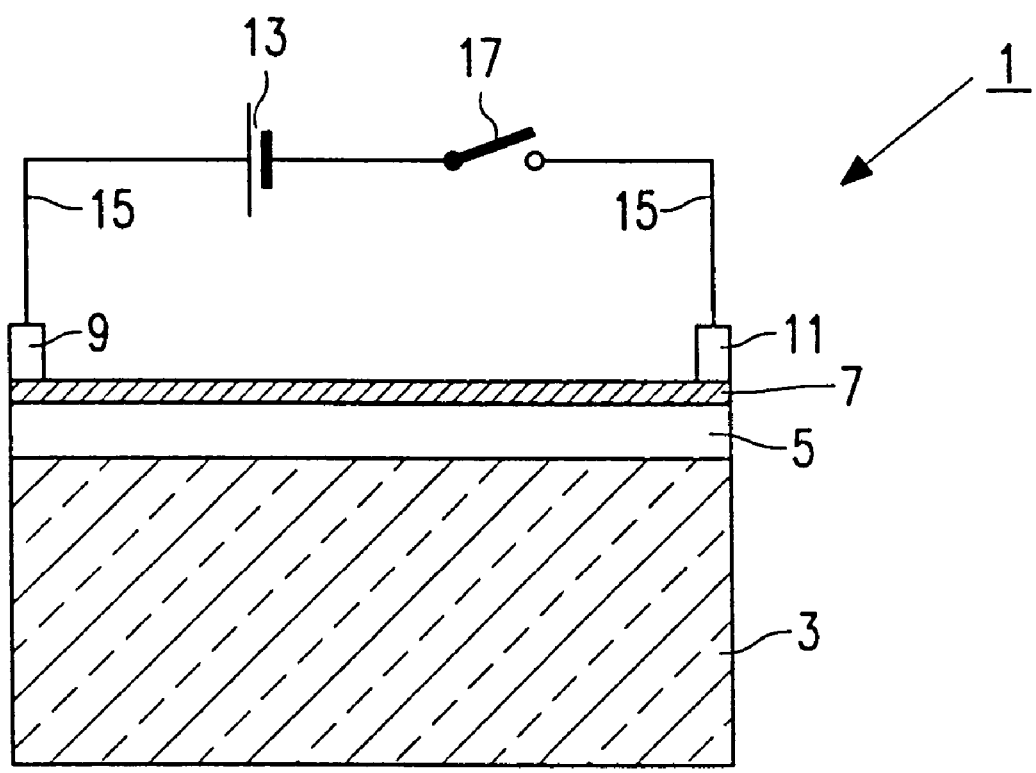

OPTICAL SWITCHING DEVICE

BACKGROUND OF THE INVENTION

The invention relates to an optical switching device comprising:

a substrate, a switching film formed on the substrate, which switching film comprises a hydride of a trivalent transition or rare earth metal and can be reversibly switched from a light-absorbing dihydride state to a transparent trihydride state by an exchange of hydrogen, a capping layer formed on the switching film, the capping layer being capable of hydrogen dissociation, and a hydrogen source which is in contact with the capping layer.

The invention also relates to the use of such a switching device.

In optical switching devices, the optical properties are governed by external influences, such as gas pressure, an electric voltage or current, temperature or light.

For example, electrochromic devices are well-known in which a layer of an electrochromic material, such as $MoO_3$, is sandwiched between two transparent electroconductive electrode layers, for example, of indium-tin oxide. A layer of an $H^+$- or $Li^+$-ion-conducting material is present between an electrode layer and the electrochromic material. The device also comprises an ion-storage layer for storing ions. The application of an electric current perpendicular to the layers causes the transmission or colour of the layer packet to change. Said transmission change is reversible. Electrochromic materials are used, for example, in variable-transmission windows for buildings and anti-dazzle mirrors in cars.

A drawback of oxidic electrochromic devices is that an extensive stack of layers is required for their operation. A further important disadvantage is that such materials enable only a small transmission change, and hence a small contrast, to be attained.

U.S. Pat. No. 5,635,72 filed by applicants, a switching device is disclosed in which a switching film of a trivalent transition or rare earth metal, such as Y and La, coated with a palladium capping layer, can be reversibly switched between a low hydrogen state ($YH_x$; $x \approx 1.7-2.5$) and a high hydrogen content ($x \approx 2.5-3$) by an exchange of hydrogen. The low hydrogen state is metallic and light absorbing, whereas the high hydrogen state is transparent. Switching of the film to the transparent state is carried out by varying the partial pressure of hydrogen gas (e.g. between 1 bar and vacuum) in contact with the Pd capping layer, which layer dissociates $H_2$-molecules into H-atoms. At a hydrogen pressure of 1 bar, the absorbent low hydrogen state is converted to the transparent high hydrogen state. After evacuation of hydrogen, the high hydrogen state is converted to the low hydrogen state. These conversions take place within a few seconds. In the following part of this document, the designations dihydride and trihydride state will be used, which correspond to a low hydrogen and high hydrogen state, respectively.

OBJECTS AND SUMMARY OF THE INVENTION

It is an object of the present invention to provide, inter alia, an optical switching device, which can be switched more readily and at a higher rate between both states. In addition, it must be possible to perform said conversion relatively rapidly, i.e. within 0.05 s, at a common temperature and pressure. Moreover, the switching device should have a simple layer structure.

In accordance with the invention, this object is achieved by an optical switching device according to the opening paragraph, and which is characterized in that the switching device is provided with means for heating and/or cooling the switching film. The variation of x of the metal hydride compound $MH_x$, in which M is a trivalent metal, is achieved by varying the temperature of the switching film.

By applying heat to the switching film, the trihydride state is converted to the dihydride state due to hydrogen release, so that the transparent film becomes light absorbing. By cooling the switching film, the dihydride state is converted to the trihydride state due to hydrogen take-up, so that the light absorbing film becomes transparent.

At fixed pressure of the hydrogen gas, the hydrogen content of the hydride of the trivalent metal is a function of the temperature. A substantially fixed hydrogen pressure is obtained when the switching film and cap layer are present in an impermeable housing comprising hydrogen gas.

Heating of the switching film can be carried out by heating means based on radiating, natural or forced convection, and conduction. In a particular embodiment, the switching device is provided with a transparent electro-conductive coating. Suitable transparent electro-conductive coatings are e.g. indium-tinoxide (ITO) or tinoxide doped with fluorine. By passing an electric current through the coating, this coating heats up by Joule-heating. The transparent conductive coating may be used as an external heater, but is preferably present between the substrate and the switching film, or is provided on the back-side of the substrate, i.e. on the substrate surface facing away from the switching film.

Cooling of the switching film may be performed by removing, or switching off, the heating means, upon which the switching film is allowed to cool to lower temperatures, e.g. to room temperature. In a preferential embodiment, the cooling means comprises a Peltier element. A Peltier element is a thermoelectric heat pump consisting of e.g. two blocks of doped BiTe ($n^+$ and $p^+$) connected on one side with a copper bridge. To the other side of the blocks, copper contacts are provided. The copper bridge is provided with a thin ceramic layer. The object to be cooled is placed on the ceramic layer. Dependent on the direction of a DC current, heat is transferred from the contact areas (cold junction) to a cooling body near the copper contacts. Peltier cooling elements are commercially available, and are used for e.g. cooling ICs, and power transistors. In a typical example, the Peltier element has dimensions of 40×40×1 mm and has 70 W cooling power.

The so-called Peltier effect is reversible: by reversing the DC current in the Peltier element, the copper bridge on the BiTe blocks heats up; the cold junction becomes a hot junction, and the Peltier element acts as a heating element. This means that the Peltier element can be used for both (rapid) heating and cooling of the switching film.

When standard Peltier elements are used, they must make close thermal contact with the switching film. For more complicated devices (like displays), these Peltier elements can be manufactured in thick and thin film technology down to (sub)micrometer dimensions. The shape of the Peltier element can be designed in such a way that the forced temperature change is brought about most effectively in a preferred area. The Peltier elements can be applied e.g. in a pixelated or meshed array.

The benefit of using Peltier elements in that the temperature region where switching of the switching film occurs can be fine-tuned by a combination of forced cooling and heating, for example in the temperature 70–90° C. This is in particular useful if the switching device operates in an environment well above room temperature. In such a situation, the Peltier element can be used for cooling the switching film, whereas heating of the switching film occurs by the environment when the Peltier element is switched off. Of course, the temperature rise can be forced by reversing the DC current in the Peltier element.

In a preferential embodiment of the invention the optical switching device is provided with electrical terminals between which an electric current can be applied, the current flowing at least through the switching film in a direction substantially parallel to the switching film, while heating the film.

In contrast with the known electrochromic devices, the current does not flow perpendicularly through the active layer, but in a plane substantially parallel to it, i.e. along the length/width dimension of the film. Without a current, the switching film remains cool, and with the current switched on, the switching film heats up. A rapid increase of the temperature is obtained by switching on an electric current through the switching film, so that Joule heating gives a temperature rise. This causes a decrease of the H-content in the switching film: the composition of the switching film approaches the dihydride state, as a result of which the light transmission decreases. When the current is switched off, the temperature decreases due to heat conduction through the substrate. By absorption of hydrogen, the composition of the film approaches the trihydride state, so that maximum transmission of light is obtained. Both hydride compositions are electrico-conductive.

Examples of trivalent metals capable of forming different hydride states are the transition metals yttrium and lanthanum, and the rare earth metals, such as gadolinium and samarium. Yttrium hydride is yellow in the transparent state, whereas lanthanum hydride is red in that state. Alloys of gadolinium and magnesium, and samarium are especially useful because of the high transmission in the transparent state, the high contrast which can be obtained, i.e. the difference of the transmission in the transparent and the non-transparent state, and because of their neutral grey appearance in the transparent state.

The switching film may also be composed of an alloy of the above-mentioned trivalent metals, for example Y—La, or it may be built up of a stack of two or more alternating thin films of said metals. If desired, the switching film may be alloyed with another metal such as magnesium. By means of these measures, the colour, stability, and switching speed of the switching film can be influenced.

Both hydride compositions, e.g of yttrium hydride, have a range of existence around the compositions $YH_2$ and $YH_3$, each composition having a width of approximately 0.2–0.5, expressed by the molar ratio x=H/Y. The exact composition of a particular metal hydride depends on that metal.

The switching film is covered with a thin capping layer of e.g. Pd, which protects the switching film against oxidation and which dissociates $H_2$ into atomic H, when the capping layer is in contact with a $H_2$ atmosphere. The capping layer enables the passage of H from a $H_2$ gas reservoir into the switching film. The layer thickness is not critical and is chosen to be in the range between 5 and 30 nm. Apart from Pd other metals can be used for the capping layer, such as Pt, Ni and Co. Other suitable metals are the alloys of the so-called $AB_2$ and $AB_5$ type, such as $TiNi_2$ and $LaNi_5$.

The switching film in accordance with the invention is thin, i.e. its thickness is preferably less than 1 $\mu$m. The thickness of the switching film preferably ranges between 100 and 1000 nm. As hydrogen must diffuse in the switching film, the film thickness determines the speed of conversion between the dihydride and the trihydride state. In the case of a film thickness of the switching film of 300 nm in combination with a 30 nm thick palladium layer, the conversion, for example, of $YH_2$ to $YH_3$, and conversely, in the switching device according to the invention takes about 0.05 seconds. A thinner or thicker layer will lead, respectively, to a shorter or longer conversion time. Moreover, the device has a simple layer structure with only two layers.

Apart from the thickness of the switching film, the conversion speed also depends on the thickness of the substrate and the hydrogen pressure.

Substrates to which the switching film can be applied are preferably transparent, e.g. glass, quartz, diamond, mica, aluminium oxide, or a polymer foil. The substrate may be even or curved.

The electrical terminals may be applied to the capping layer or they may be directly connected to the switching film. Because of the large difference in thickness between the capping layer and the switching film, most of the current will flow through the switching film if the terminals are applied to the capping layer.

For the hydrogen source use can be made of molecular hydrogen gas. Preferably, the switching device is located in a room which comprises hydrogen gas at substantially constant pressure. Alternatively, a layer of a hydrogenated (sub-)oxidic material such, as $WO_3$, $NiO_x$ and $V_2O_5$, in contact with the capping layer can be used. Said layers can be loaded with hydrogen by sputtering the metal oxide in a hydrogen atmosphere. The thickness of the hydrogen source layer is chosen in such a way that the hydrogen capacity in the source layer is sufficient to convert the switching film from the dihydride state into the trihydride state, and vice versa.

The switching film is applied as a thin film to the substrate by means of conventional methods, such as vacuum evaporation, sputtering, laser ablation or chemical vapour deposition. In this respect, it is important that during and after application of the switching film, the metal of the switching film is not subject to oxidation. In a vacuum-evaporation process this is achieved by maintaining the pressure, in particular, of the residual gases, water and oxygen, at a low level below $10^{-6}$ to $10^{-7}$ mbar.

The capping layer, for example, of Pd can alternatively be applied by means of one of the above-mentioned methods.

Preferably, a DC current is used to obtain a maximum effect. The dark/light contrast increases as the applied currents increase. An AC current may also be used, but during the voltage cycles of e.g. 50 Hz, the switching film periodically heats up and cools down, so that an average transparency is obtained. As a result the difference in transparency between the current on and of-states is smaller than that between the DC current on and off-states.

By virtue of the optical effect, the switching device can be used as an optical switching element, for example as a variable beam splitter, and for controlling the illuminance or the shape of light beams in luminaires, such as car head lights.

Dependent upon the film thickness of the switching film, and the type of the trivalent metal, this film can exhibit zero transmission in the absorbing state. This enables a switching device having a great contrast range to be manufactured. Contrasts of 3000 are already obtained.

The switching device can also be used for creating three-dimensional TV. A 3D effect is obtained by looking through a pair of glasses, of which the two glasses are alternately dark and transparent, but with a phase difference π/2, just in phase with two images camera-recorded from two different angles.

In another application, being two persons wearing glasses, with dark or light being in antiphase, simultaneously watch one of two different TV programs, which are projected in antiphase on the TV screen.

The switching device can be used in applications in which electrochromic layers are presently being used, such as architectural glass, sun roofs and rear-view mirrors.

The switching device can also be used as a variable transmission filter for a display screen to improve the contrast.

BRIEF DESCRIPTION OF THE DRAWINGS

These and other aspects of the invention will be apparent from and elucidated with reference to the embodiments described hereinafter.

In the drawings:

The FIGURE is a schematic cross-sectional view of a switching device in accordance with the invention.

EXEMPLARY EMBODIMENT

FIG. 1 is a schematic, cross-sectional view of a switching device 1 in accordance with the invention. In this FIGURE, the layer thicknesses are not drawn to scale. A glass substrate 3, having a thickness of 0.5 mm, is provided with a 300 nm thick yttrium film, which serves as a switching film 5, by means of electron-beam evaporation. The residual pressure in the evaporation apparatus is less than $10^{-7}$ mbar. The deposition rate is 0.5 nm/s. In the same apparatus, a 30 nm thick capping layer 7 of palladium is evaporated onto the switching film 5 by means of resistance heating. The capping layer 7 is provided with copper terminals 9 and 11 by soldering.

The switching film 5 is subsequently exposed to molecular hydrogen via the capping layer 7, at a pressure of 1.5 bar ($1.5 \times 10^5$ Pa) and at room temperature in an enclosure (not shown) which is shut off from the environment. The capping layer 7 forms atomic H, which is subsequently absorbed in the switching film 5. After 5 seconds, the switching film 5 has been converted to a transparent light yellow film comprising yttrium in the trihydride state and having a transmission of approximately 20%. The capping layer 7 remains permanently in contact with the molecular hydrogen.

Subsequently, the terminals 9 and 11 are connected by means of copper leads 13 to a DC voltage source 15 having a voltage of 10V. A current switch 17 is connected in series with the voltage source 15 and the leads 13. Upon closing the switch 17, a current of 100 mA flows through the switching film 5, and, as result, the temperature of the switching film 5 increases by Joule heating. The H-content of the switching film 5 decreases to the light absorbing dihydride state. The optical change takes place very rapidly, i.e. within 0.05 seconds.

By opening the switch 17, the current is switched off, which causes the switching film 5 to cool down. The H-content of the switching film 5 increases to the trihydride state within 0.05 seconds, which state is transparent. This process can be repeated many times, e.g. by using a block-shaped DC current of 20 Hz.

The optical switching device in accordance with the invention can be reversibly switched from a light-absorbing state to a transparent state by switching on and off an electric current which flows through the switching film of the device.

What is claimed is:

1. An optical switching device comprising:
   a substrate,
   a switching film formed on the substrate, which switching film comprises a hydride of a trivalent transition or rare earth metal and can be reversibly switched from a light-absorbing dihydride state to a transparent trihydride state by an exchange of hydrogen,
   a capping layer formed on the switching film, the capping layer being capable of hydrogen dissociation, and
   a hydrogen source which is in contact with the capping layer, characterized in that the switching device is provided with means for heating and/or cooling the switching film.

2. A switching device as claimed in claim 1, characterized in that the heating means comprises a transparent electro-conductive coating.

3. A switching device as claimed in claim 1, characterized in that the heating means comprises electrical terminals between which an electric current can be applied, the current flowing at least through the switching film in a direction substantially parallel to the switching film, while heating the film.

4. A switching device as claimed in claim 1, characterized in that the means for cooling and/or heating is a Peltier element in thermal contact wit the switching film.

5. A switching device as claimed in claim 1, characterized in that the switching film comprises gadolinium or samarium.

6. A switching device as claimed in claim 1, characterized in that the capping layer comprises at least one metal selected from the group consisting of palladium, platinum, cobalt or nickel.

7. A switching device as claimed in claim 1, characterized in that the capping layer has a thickness of 5 to 30 nm.

8. A switching device as claimed in claim 1, characterized in that the switching film has a thickness in the range from 100 to 1000 nm.

9. The use of a switching device as claimed in claim 1 in or for a display, or for controlling a light beam.

* * * * *